United States Patent
Seksaria et al.

(10) Patent No.: US 7,466,091 B2
(45) Date of Patent: Dec. 16, 2008

(54) BRAKE RESPONSIVE VEHICLE ELECTRIC DRIVE SYSTEM

(75) Inventors: Arun Kumar Seksaria, Cedar Falls, IA (US); Mervin Peter Kizlyk, Cedar Falls, IA (US); Robert Eugene Kasten, Denver, CO (US)

(73) Assignee: Deere & Company, Moline, IL (US)

( * ) Notice: Subject to any disclaimer, the term of this patent is extended or adjusted under 35 U.S.C. 154(b) by 160 days.

(21) Appl. No.: 11/673,275

(22) Filed: Feb. 9, 2007

(65) Prior Publication Data

US 2008/0191650 A1    Aug. 14, 2008

(51) Int. Cl.
*H02P 3/00* (2006.01)

(52) U.S. Cl. .................. 318/375; 318/362; 318/273; 318/703; 318/400.01; 180/65.1; 180/65.2; 180/65.3

(58) Field of Classification Search ......... 318/375, 318/362, 273, 703, 400.01; 180/65.1, 65.2, 180/65.3
See application file for complete search history.

(56) References Cited

U.S. PATENT DOCUMENTS

| | | | | |
|---|---|---|---|---|
| 5,366,280 A | * | 11/1994 | Littlejohn | 303/3 |
| 5,366,281 A | * | 11/1994 | Littlejohn | 303/3 |
| 5,531,514 A | * | 7/1996 | Nishii et al. | 303/116.1 |
| 5,539,641 A | * | 7/1996 | Littlejohn | 701/70 |
| 5,649,747 A | * | 7/1997 | Naito et al. | 303/113.5 |
| 6,027,183 A | * | 2/2000 | Katayose et al. | 303/146 |
| 6,123,398 A | * | 9/2000 | Arai et al. | 303/140 |
| 6,402,259 B2 | * | 6/2002 | Corio et al. | 303/20 |
| 6,492,785 B1 | * | 12/2002 | Kasten et al. | 318/434 |
| 7,059,691 B2 | * | 6/2006 | Tsunehara et al. | 303/152 |

\* cited by examiner

*Primary Examiner*—Rita Leykin

(57) ABSTRACT

The invention relates to a vehicle electric drive system. There is a need for a brake responsive vehicle electric drive system. A vehicle electric drive system includes an internal combustion engine, an electric motor/generator driven by the engine, and drive wheels driven by a traction motor/generator. The motor/generators are controlled by a control system which receives signals from an operator speed control member, wheel speed sensors, and a pair of brake pedal position sensors, each connected to a corresponding left or right brake pedal. In response to operation of the brake pedals, the controller coordinates operation of the electric drive system with operation of the brake pedals.

13 Claims, 3 Drawing Sheets

BRAKE RESPONSIVE VEHICLE ELECTRIC DRIVE SYSTEM

BACKGROUND

This invention relates to an electric drive system for a vehicle.

Vehicle electric drive systems or AC electric traction drives have been proposed to overcome some of the deficiencies of mechanical transmission systems, such as a limited number of speeds, increased costs of engineering and manufacturing components, and limiting vehicle configuration options. Such an electric drive system is described in U.S. Pat. No. 6,492,785, issued 10 Dec. 2002 and assigned to the assignee of the present application. This system includes an internal combustion engine, an electric motor/generator driven by the engine, a first inverter/rectifier coupled to motor/generator, a bus coupled to the first inverter/rectifier, a second inverter/rectifier coupled to the bus, and a traction motor/generator coupled to an output of the second inverter/rectifier, an operator speed control member, and a controller coupled to the second inverter/rectifier for controlling a current output of the second inverter/rectifier as a function of a position of the speed control member. This system also includes an operator controlled limit control member, and a transducer coupled to the limit control member. The controller receives the limit command signal and limits current supplied by the second inverter/rectifier to the traction motor/generator, so that from an operators viewpoint, in response to manipulation of the operator controlled limit control member, the electric drive system operates and reacts like a mechanical slipping clutch.

Vehicles supplied with such an electric drive system would also necessarily include conventional wheel brakes operated in response to operated controlled brake control devices, such as brake pedals. However, the previously described electric drive system has no provision for coordination with the vehicle brake system. As a result, if an operator would desire to reduce vehicle speed, the operator must not only apply the brakes, he must also separately do something to reduce the output speed of the electric drive system. It would be desirable to provide a vehicle electric drive system which is responsive to or coordinated with the operation of the vehicle brakes.

SUMMARY

Accordingly, an object of this invention is to provide a vehicle electric drive system which is responsive to or coordinated with the operation of the vehicle brakes.

A further object of the invention is to provide such a vehicle electric drive system which limits deceleration or acceleration and to prevent abrupt or jerky speed changes of the vehicle.

A further object of the invention is to provide such a vehicle electric drive system which, when a brake command member is moved to reduce vehicle speed, the traction motor/generator functions as a generator and the driven motor/generator functions as a motor.

These and other objects are achieved by the present invention, wherein a brake responsive vehicle electric drive system is provided. A vehicle electric drive system includes an internal combustion engine, an electric motor/generator driven by the engine, and drive wheels driven by a traction motor/generator. The motor/generators are controlled by a control system which receives signals from an operator speed control member, wheel speed sensors, and a pair of brake pedal position sensors, each connected to a corresponding left or right brake pedal. In response to operation of the brake pedals, the controller coordinates operation of the electric drive system with operation of the brake pedals.

DETAILED DESCRIPTION

Figure 1:
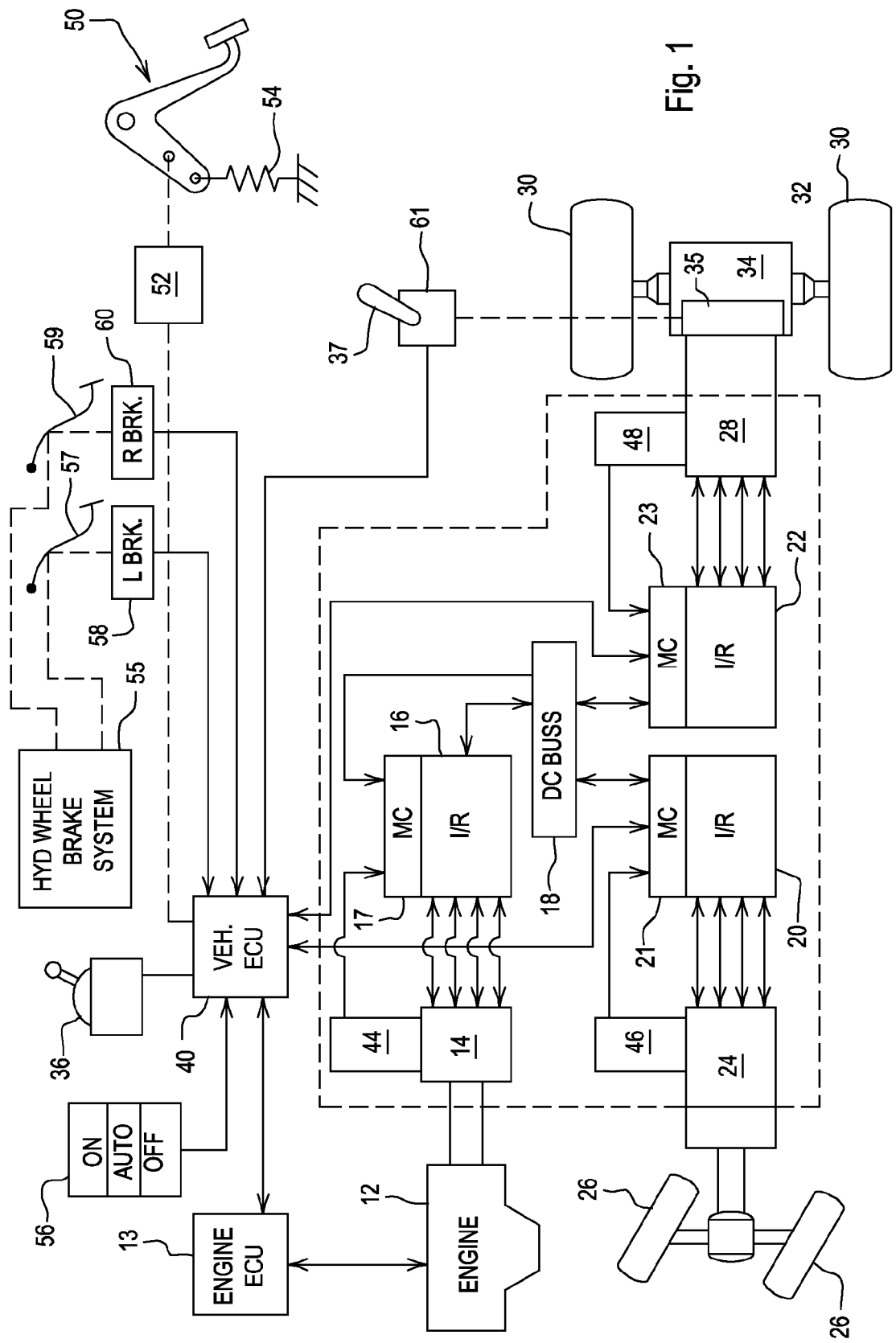
FIG. 1 is a simplified schematic diagram of a vehicle electric drive system according to the present invention.

Referring to FIG. 1, a vehicle electric drive system 10 includes an internal combustion engine 12 controlled by electronic engine control unit (ECU) 13. The engine 12 drives a 3-phase electric motor/generator 14 which supplies electrical power to and receives power from a bi-directional inverter/rectifier 16, which is coupled to a high voltage DC buss 18. The buss 18 feeds power to and receives power from bi-directional inverter/rectifiers 20 and 22. Inverter/rectifier 20 is coupled to traction motor/generator 24 which drives and receives power from front wheels 26. Inverter/rectifier 22 is coupled to traction motor/generator 28 which drives and receives power from rear wheels 30 via axle 32 via speed reducer 34. Speed reducer 34 includes a high/low range box 35 which is controlled by a high/low range selector lever 37. Each inverter/rectifier 16, 20 and 22 is controlled by a corresponding micro-controller 17, 21 and 23, respectively. There are no batteries involved in the drive train as are normally used on drives for automobiles and buses.

The motors 24 and 28 are preferably DC brushless permanent magnet motors. Preferably, the rear motor 28 drives the rear axle through a two speed mechanically shifted gear box. Two speed gearing results in efficient motor operation because high gear provides the required speed to the axle for transport speeds, while the low gear provides the required torque to the axle for heavy pulling at low speeds.

An electronic vehicle control unit VCU 40 communicates with an operator controlled speed command lever 36, the ECU 13, various sensors (not shown), and the micro-controllers 21 and 23. Rotor position sensors 44, 46 and 48 are coupled to each of the motor/generators 14, 24 and 28 and supply a rotation position signal to the corresponding micro-controllers 21 and 23, 42, which derive a speed signal therefrom. The inverter/rectifiers 20, 22 invert and convert the DC buss current to a 3-phase AC current at a frequency to drive the wheels at a speed commanded by the operator via the speed command lever 36. The rotor position sensors 46, 48, and the micro-controllers 21, 23 form a closed speed control loop for each of the electric drive motors 24 and 28, in which the micro-controllers 21, 23 calculate a speed error from the difference between the commanded speed from lever 36 and the actual speed derived from sensors 46, 48, and a current is applied to the motors as a function of the speed error.

A foot operated clutch pedal 50, is coupled to a transducer 52, such as a potentiometer, which generates a transducer signal (or limit command signal) representing the position of the pedal 50. A spring 54 biases the pedal 50 to its raised position. A three position front wheel drive FWD switch 56 is also coupled to the VCU 40.

Left and right brake pedal position sensors 58 and 60 are also coupled to the VCU 40. Sensors 58 and 60 generate brake pedal position signals which have a maximum magnitude when the corresponding brake pedal is not depressed and which decrease in magnitude as the corresponding pedal is depressed. The brake sensors are operatively coupled to left and right brake pedals 57 and 59, respectively. The left and right brake pedals 57 and 59 control a convention hydraulic wheel brake system 55. The VCU 40 receives signals from switch 56, sensors 58 and 60, the speed command lever 36 and the clutch pedal transducer 52. The VCU 40 also receives signals from a range box sensor switch 61 which provides VCU 40 with a signal representing the status of the high/low range box 35.

Although FIG. 1 shows a system with multiple drive motors driving multiple sets of driven wheel, the preset invention is also applicable to a vehicle drive system having only a single set of driven wheels, either steered wheels or non-steered wheels.

Figure 2:
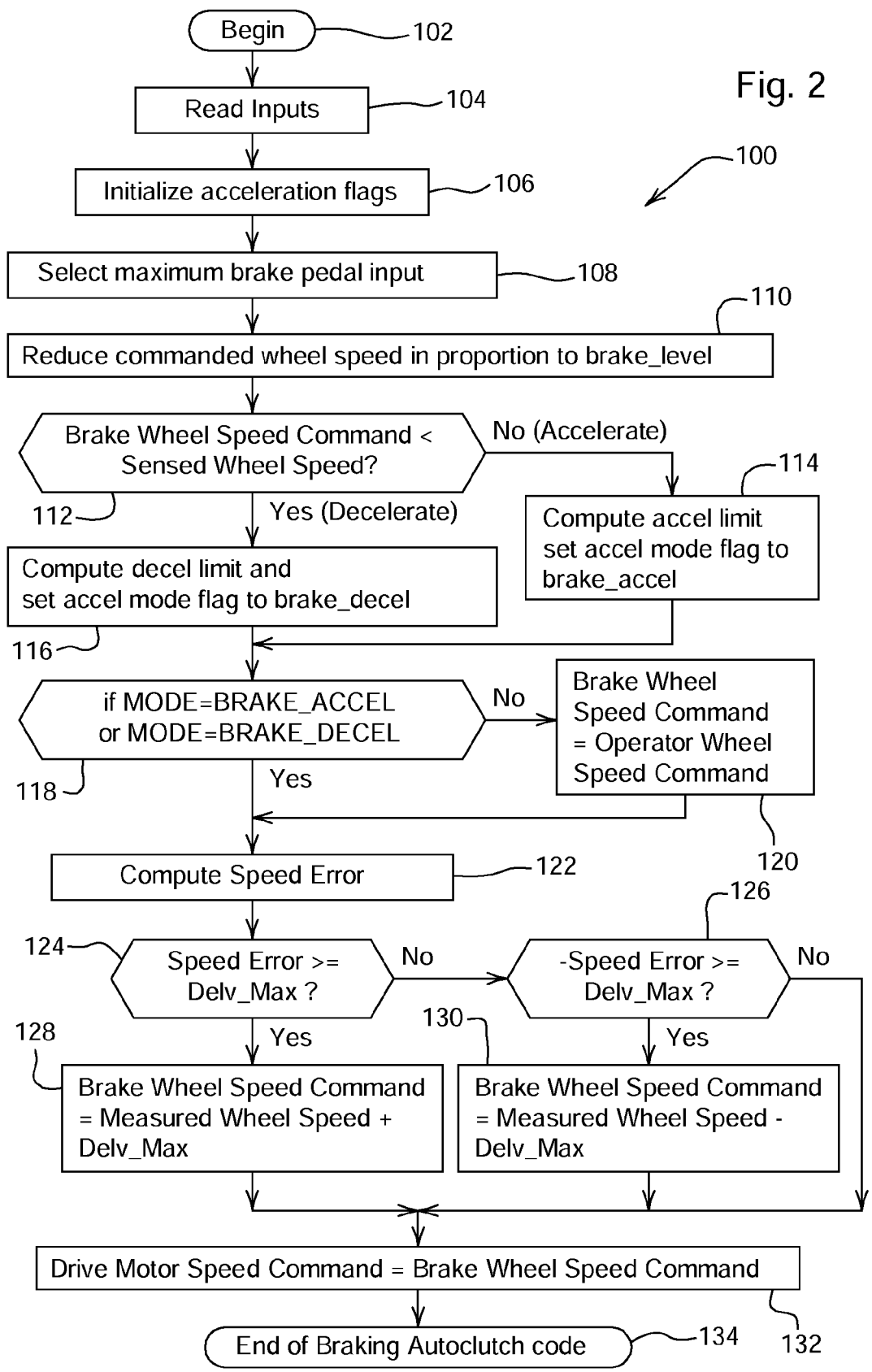
FIG. 2 is a logic flow diagram of an algorithm executed by the vehicle ECU of the control system of FIG. 1.

The VCU 40 executes an algorithm represented by FIG. 2, and generates a wheel speed command signal which causes the motors 24 and 28 to drive accelerate or decelerate the wheels 26 and 30.

Referring now to FIG. 2, the algorithm 100 begins at step 102 when called from a main algorithm loop (not shown) which generates a vehicle speed command value which is applied to the micro-controllers 21, 23. Step 104 reads various inputs, including an Operator Wheel Speed Command from speed command 36, a Sensed Wheel Speed value derived from rotor position sensors 46 and 48, and left and right brake pedal position values from sensors 58 and 60. Step 106 initializes an acceleration flag to 0, indicating no acceleration limit associated with braking.

Step 108 selects the maximum of the left and right brake pedal position signals and sets a Brake Level value to the maximum thereof. This prevents interference with use of the brakes for steering purposes.

Step 110 computes a Brake Wheel Speed Command by multiplying the Operator Wheel Speed Command by the Brake Level value divided by the largest possible Brake Level value. This adjusts or reduces the wheel speed command in proportion to the Brake level.

Step 112 compares the Brake Wheel Speed Command to the sensed wheel speed. If Brake Wheel Speed Command is not less than the sensed wheel speed, this means that the active mode is an acceleration mode and the algorithm proceeds to step 114. If Brake Wheel Speed Command less than the sensed wheel speed, this means that the active mode is a deceleration mode and the algorithm proceeds to step 116.

Figure 3:
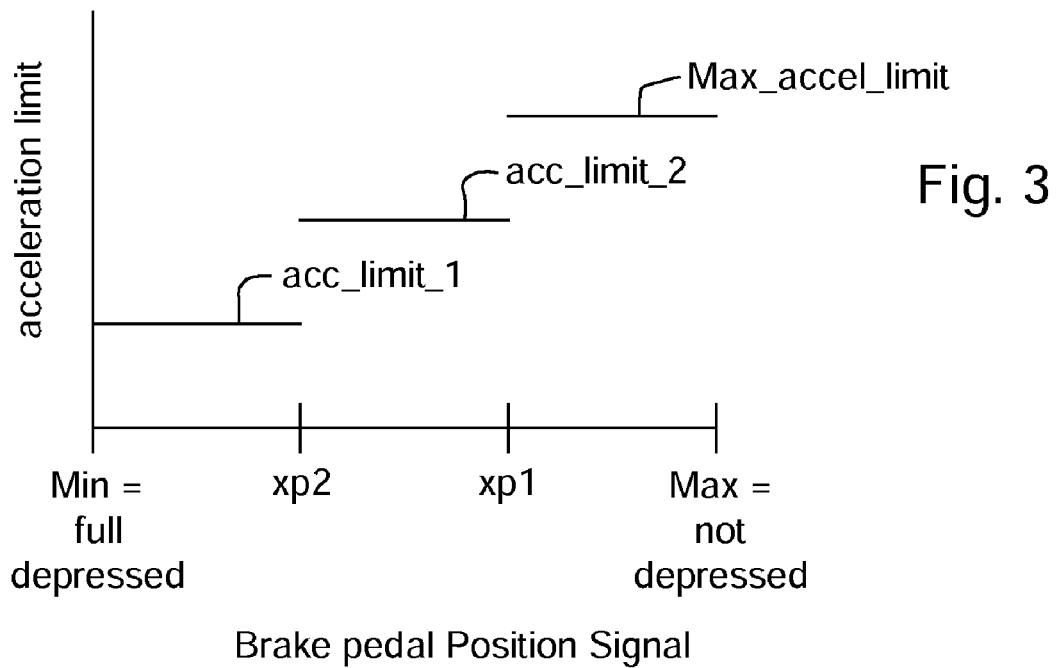
FIGS. 3 and 4 graphically illustrate functions performed by the controller of FIG. 1.

Step 114 computes an acceleration limit value, Delv_Max, as a function of Brake Level (brake pedal position) according to the function illustrated in FIG. 3, and sets an acceleration mode flag to brake_accel, after which the algorithm proceeds to step 118.

Figure 4:
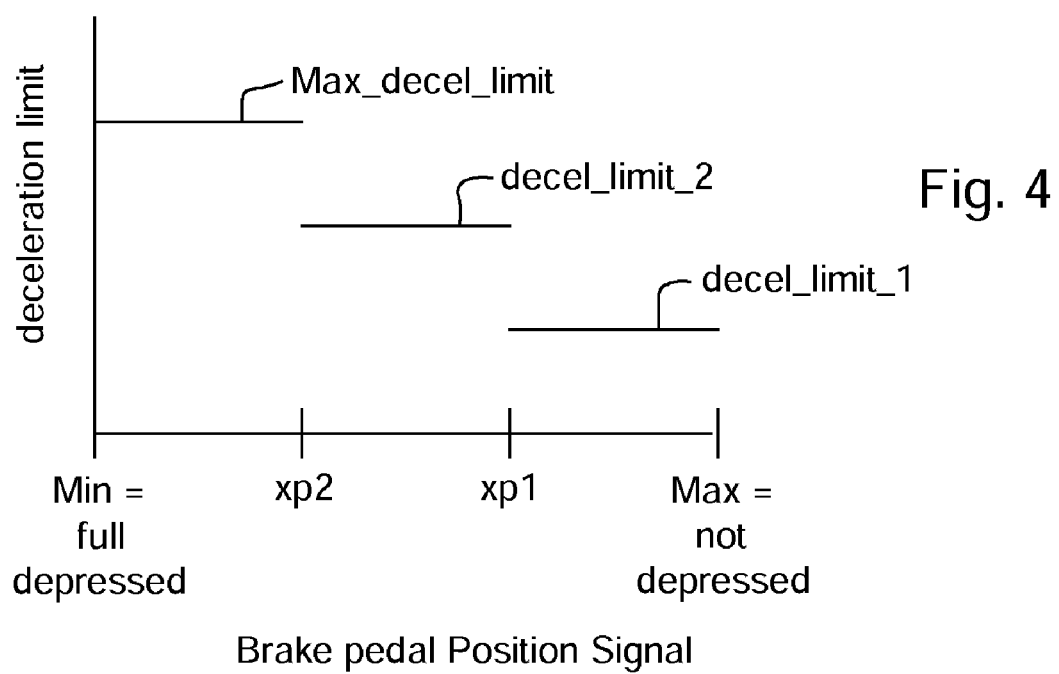

Step 116 computes a deceleration limit value, Delv_Max, as a function of Brake Level (brake pedal position) according to the function illustrated in FIG. 4, and sets a deceleration mode flag to brake_decel, after which the algorithm proceeds to step 118.

Step 118 determines whether the active mode is either brake_accel or brake_decel. If neither of these modes is active the algorithm proceeds to step 120 which sets the Brake Wheel Speed Command equal to the Operator Wheel Speed Command (from speed command lever 36). If either of these modes is active, then step 118 directs the algorithm to step 122 which computes a Speed Error value as a difference between Brake Wheel Speed Command and the Sensed Wheel Speed.

Then, steps 124 and 126 compares the Speed Error to Delv_Max. If Speed Error is greater than or equal to Delv_Max, step 124 directs the algorithm to step 128. If Speed Error is less than Delv_Max, step 124 directs the algorithm to step 126.

In step 126, if −Speed Error is greater than or equal to Delv_Max, step 126 directs the algorithm to step 130. If −Speed Error is less than Delv_Max, step 126 directs the algorithm to step 132.

Step 128 sets Brake Wheel Speed Command equal to the Sensed Wheel Speed+Delv_Max.

Step 130 sets Brake Wheel Speed Command equal to the Sensed Wheel Speed−Delv_Max.

Thus, steps 124-130 operate to modify the drive motor speed command to the sensed wheel speed plus or minus an acceleration limit (depending upon the sign of the instantaneous speed error.

Finally, step 132 sets the Drive Motor Speed Command to the Brake Wheel Speed Command set at either step 128 or 130.

FIG. 3 graphically illustrates how step 114 determines the Delv_Max value as a function of brake pedal position during acceleration. The Delv_Max value is set to an upper value Max_accel_limit if the brake pedal is between an not-depressed position and a first partially depressed position represented by xp1. The Delv_Max value is set to an intermediate value acc_limit_2 if the brake pedal is depressed between position xp1 and position xp2. The Delv_Max value is set to an lower value acc_limit_1 if the brake pedal is depressed between xp2 and a fully depressed position.

FIG. 4 graphically illustrates how step 116 determines the Delv_Max value as a function of brake pedal position during deceleration. The Delv_Max value is set to an upper value Max_decel_limit if the brake pedal is between a fully depressed position and depressed position xp2. The Delv_Max value is set to an intermediate value decel_limit_2 if the brake pedal is between depressed positions xp2 and xp1. The Delv_Max value is set to a lower value decel_limit_1 if the brake pedal is between depressed position xp1 and a fully released position.

In both FIGS. 3 and 4, the brake pedal position signal increases in magnitude as the brake pedal is released. The functions of FIG. 4 is used when the desired wheel speed is less than the actual wheel speed, or the function of FIG. 3 is used when the desired wheel speed is greater than the actual wheel speed. The functions of FIGS. 3 and 4 are step functions dependent on the output of the brake pedal position sensor. Delv_Max is set to the value returned by whichever function is called.

As a result, for decleration, the wheel speed (and vehicle speed) respond less aggressively to a light braking command (pedal depression) and increasingly aggressively to increased braking commands. And, when the operator is decreasing the pedal position (allowing the pedal to raise) and the wheel speed (and vehicle speed) accelerate in response, the response is less aggressive when the pedal position is nearly fully depressed and increasingly aggressive as the operator lets up on the brake pedal.

With this algorithm 100, when the brake pedals 57, 59 are depressed, the system reverses the direction of power flow between the generator 14 and the drive motors 24, 28 and causes the electric transmission to produce a braking torque to assist the normal hydraulic braking action. In the braking mode, the drive motors 24, 28 operate as generators and the generator 14 acts as a motor. The generator 14 (acting as a motor) then drives the diesel engine 12 at greater than the commanded speed, which dissipates the energy from the drive motors 24, 28 (which are acting as generators). To accomplish this, the algorithm 100 modifies the drive motor speed command as a function of the position of brake pedals 57, 59, which reduces the commanded wheel speed. The deceleration rate is a function of the position of the brake pedals 57, 59.

When the commanded drive motor speed is less than the actual drive motor speed, the drive motor inverters 20, 22 reverse the direction of current flow to produce a (braking) torque that reduces drive motor speed. This causes the voltage on buss 18 to rise, and when the bus voltage exceeds the commanded level, the generator inverter 16 reverses the direction of current flow in the generator 14. This produces a torque which speeds up the generator 14 and, in turn, lowers the bus voltage. Since the generator 14 is directly coupled to the diesel engine 12, engine speed is increased above commanded speed which dissipates the energy.

Steps 114-122 operate to modify the Brake Wheel Speed Command to limit deceleration or acceleration and to prevent abrupt or jerky speed changes of the vehicle.

While the present invention has been described in conjunction with a specific embodiment, it is understood that many alternatives, modifications and variations will be apparent to those skilled in the art in light of the foregoing description. For example, the present invention is applicable to a vehicle drive system having only a single electric drive motor driving one or more sets of driven wheels, or to a system having multiple electric drive motors. The single or the multiple electric drive motor may drive either steered wheels or non-steered wheels. Accordingly, this invention is intended to embrace all such alternatives, modifications and variations which fall within the spirit and scope of the appended claims.

We claim:

1. A vehicle electric drive system, comprising:
   a brake system having operator controlled left and right brake command members operative connected to a vehicle brake system;
   left and right brake transducers, each coupled to a corresponding one of the brake command members, and generating a brake position signal representing a position of the corresponding brake command member;
   an electric drive system having an internal combustion engine, an engine driven electric motor/generator, a first inverter/rectifier coupled to the driven motor/generator, a buss coupled to the first inverter/rectifier, a second inverter/rectifier coupled to the buss, and a traction motor/generator coupled to an output of the second inverter/rectifier and drivingly coupled to driven vehicle wheels, an operator speed control member, and a controller coupled to the second inverter/rectifier for controlling a current output of the second inverter/rectifier as a function of a position of the speed control member, the controller receiving the brake position signals and coordinating operation of the electric drive system with operation of the brake command members.

2. The brake and drive system of claim 1, wherein:
   when a brake command member is moved to reduce vehicle speed, the controller responds by controlling the driven motor/generator and the traction motor/generator so that the traction motor/generator functions as a generator and the driven motor/generator functions as a motor.

3. The control of claim 1, wherein:
   the left transducer generates a left brake command member position signal, and the right transducer generates a right brake command member position signal; and
   the controller selects a maximum of the left and right brake commend member position signals and controls the electric drive system as a function of said maximum.

4. The control of claim 1, wherein:
   the controller operates to decelerate the vehicle with increasing aggressiveness in response to increasing application of the brake command members.

5. The control of claim 1, wherein:
   the controller operates to accelerate the vehicle with increasing aggressiveness in response to decreasing application of the brake command members.

6. The control of claim 1, wherein:
   the controller operates to prevent abrupt speed changes of the vehicle.

7. The control of claim 1, wherein:
   the controller controls vehicle speed in response to a speed command signal from the speed control member, and the controller modifies the speed command signal in response to operation of the brake command members.

8. A vehicle electric drive system, comprising:
   an electric drive system having an internal combustion engine, an engine driven electric motor/generator, a traction motor/generator powered by the driven motor/generator and coupled to driven vehicle wheels, and an operator speed control member generating a speed command signal;
   a brake system having operator controlled left and right brake pedals members operative connected to a vehicle brake system;
   left and right brake pedal sensors, each coupled to a corresponding one of the brake pedals, and generating a brake pedal position signal; and
   a controller for controlling the electric drive system as a function of the speed command signal, the controller modifying control of the electric drive system in response to the brake pedal position signals.

9. The brake and drive system of claim 8, wherein:
   when a brake pedal is moved to reduce vehicle speed, the controller responds by controlling the driven motor/generator and the traction motor/generator so that the traction motor/generator functions as a generator and the driven motor/generator functions as a motor.

10. The control of claim 8, wherein:
    the left transducer generates a left brake pedal position signal, and the right transducer generates a right brake pedal position signal; and
    the controller selects a maximum of the left and right brake pedal position signals and controls the electric drive system as a function of said maximum.

11. The control of claim 8, wherein:
    the controller operates to decelerate the vehicle with increasing aggressiveness in response to increasing application of the brake pedals.

12. The control of claim 8, wherein:
    the controller operates to accelerate the vehicle with increasing aggressiveness in response to decreasing application of the brake pedals.

13. The control of claim 1, wherein:
    the controller operates to prevent abrupt speed changes of the vehicle.

* * * * *